2 Sheets—Sheet 1.

C. E. DAVIS.

Assignor, by mesne assignments, to THE TRANS-CONTINENTAL CAR LOCK AND SEAL COMPANY.

SEAL LOCK.

No. 11,011. Reissued July 9, 1889.

Witnesses:
H. A. Kennedy.
F. Stanley Elmore.

Inventor:
Chas. E. Davis
By Burton and Burton
Their Attorneys

N. PETERS, Photo-Lithographer, Washington, D. C.

C. E. DAVIS.

Assignor, by mesne assignments, to THE TRANS-CONTINENTAL CAR LOCK AND SEAL COMPANY.

SEAL LOCK.

No. 11,011. Reissued July 9, 1889.

Witnesses:
H. A. Kennedy.
F. Stanley Elmore.

Inventor:
Chas. E. Davis

By Burton & Burton
Their Attorneys

N. PETERS, Photo-Lithographer, Washington, D. C.

UNITED STATES PATENT OFFICE.

CHARLES E. DAVIS, OF CHICAGO, ILLINOIS, ASSIGNOR, BY MESNE ASSIGNMENTS, TO THE TRANS-CONTINENTAL CAR LOCK AND SEAL COMPANY, OF SAME PLACE.

SEAL-LOCK.

SPECIFICATION forming part of Reissued Letters Patent No. 11,011, dated July 9, 1889.

Original No. 371,037, dated October 4, 1887. Application for reissue filed April 24, 1889. Serial No. 308,477.

*To all whom it may concern:*

Be it known that I, CHARLES E. DAVIS, a citizen of the United States, residing at Chicago, county of Cook, and State of Illinois, have invented certain new and useful Improvements in Seal-Locks, of which the following is a full, clear, and exact description, reference being had to the accompanying drawings, and to the letters of reference marked thereon, which form part of this specification.

My invention relates to seal-locks of the class particularly designed for employment on or about car-doors, and it is an improvement on the seal-lock patented to me May 10, 1887, No. 362,823.

The main features of novelty and utility embodied in my present invention are as follows: A bolt operatively sustained by a suitable frame, preferably rigidly connected with the car or car-door and capable of subserving the general purposes of the ordinary shackle-pin usually employed conjointly with a hasp and keeper, or equivalent devices for securing a car-door in a closed position, and for which it is obviously substituted, is arranged and adapted to be carried into a suitable locking position, from which it cannot be withdrawn or removed, so as to admit of the opening of the car-door without evidencing such withdrawal or removal through the destruction, by suitable means forming part of or fixed to said bolt, of an adjacently-located frangible sealing-plate, which is likewise sustained by said frame.

The essential feature of the invention is the operative arrangement of the said bolt and sealing-plate with relation to each other, which differs from the arrangement in my said former patent, No. 362,823, in two prominent respects: first, in that the projection on the bolt, which retains the seal in place, is carried into operative position for that purpose by the longitudinal movement of the bolt; second, in that the bolt reaches the position necessary to retain the hasp or staple, as the case may be, by its longitudinal movement.

Figure 1:
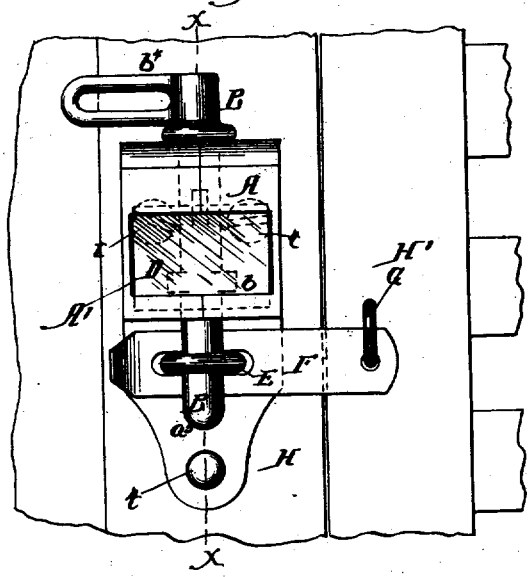
Figure 2:
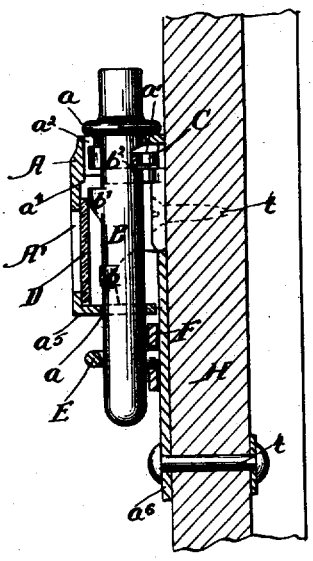
Figure 3:
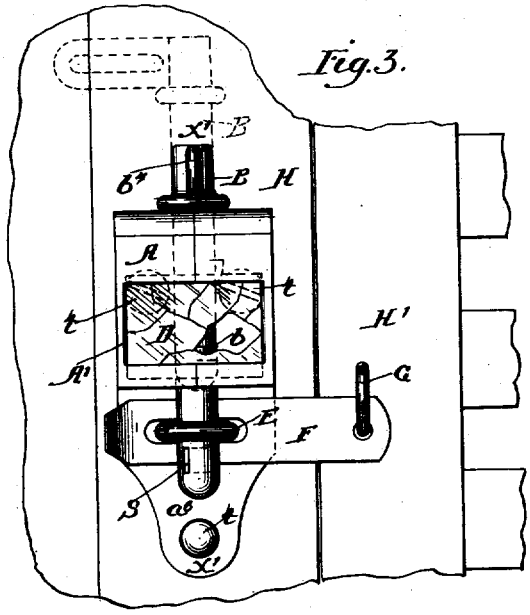
Figure 4:
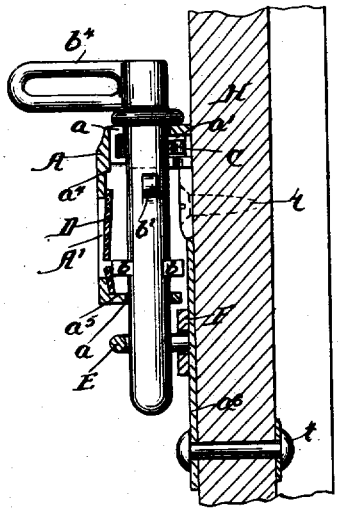
Figure 5:
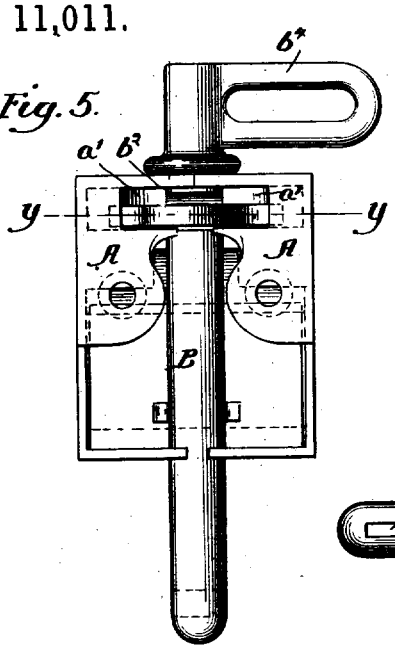
Figure 7:
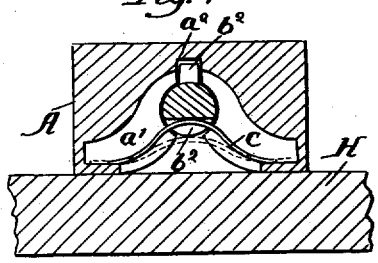
Figure 8:
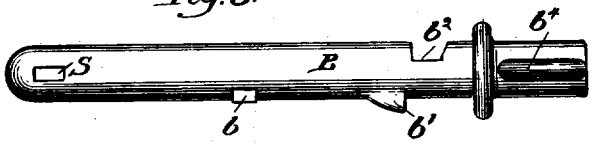
Figure 6:
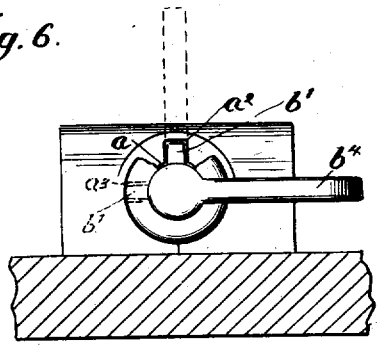
Figure 9:
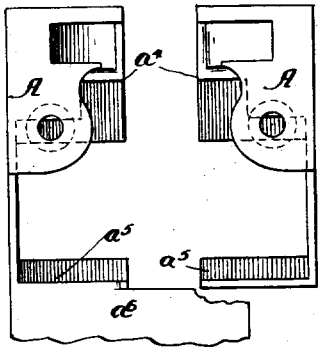

In the accompanying drawings, which comprehensively illustrate my said invention, Figure 1 shows in front elevation a seal-lock embodying the principles of my invention applied to a car, with the car-door secured in closed position by the said bolt, which is in its locked position. Fig. 2 is a vertical section through the frame of the lock and the car-door jamb upon the line X X of Fig. 1. Fig. 3 is a front elevation of the said lock applied to the car-door similarly as shown in Fig. 1, said view being mainly intended to illustrate the bolt as having been moved from its locking position and the sealing-plate as having been destroyed through such movement thereof. Fig. 4 is a vertical section taken on the line X′ X′ of Fig. 3, further illustrating the bolt in its unlocked position and the manner of its breaking the sealing-plate in being carried thereto. Fig. 5 is an enlarged rear view of the said device, showing the general features of its construction and arrangement, the bolt being in locked position, substantially as shown in Fig. 1. Fig. 6 is a top view of said device, the bolt occupying a similar position to that shown in Fig. 5. Fig. 7 is a transverse section taken through the device on the line Y Y of Fig. 5, looking in the direction of the arrow therein shown. Fig. 8 illustrates the construction of the bolt shown in the several described views. Fig. 9 is a rear elevation of the frame, substantially showing the preferred manner of its construction and arrangement.

Referring by letter to the several figures of the drawings, in which like letters denote like parts, A indicates a frame, which is provided with means for suitably sustaining the several operative parts of the device, and, by preference, adapted to be fixedly secured in position in or about the car-door.

B refers to a bolt adapted to hold the car-door in closed position in substitution for the shackle-pin or other device employed in conjunction with a hasp and keeper F E or other equivalent devices intended for such purpose. The said bolt, which is adapted to work axially and perpendicularly in bearings *a a*, formed by the frame A, is provided with a suitable seal-breaking projection *b* and with a radially-projecting longitudinally-tapering lug *b′*, the office of which will be hereinafter shown. The bolt is also provided near its upper termination with a transverse recess $b^2$, within which works, as is hereinafter more particularly explained, a leaf-spring C, which is secured in operative position within a suitable recess $a'$, provided therefor within said frame. The said frame A, for the convenience of construction and adaptation to the bolt B, &c., is desirably formed in two sections, as particularly shown in Fig. 9, which are held in working contiguity, as shown in the other views, by means of screws or bolts $t$, which are entered therefrom into or through the wood-work or other material to which it is desired to fix the same.

The upper or cap wall of the frame is provided with slots $a^2$ $a^3$, (see Fig. 6,) which open into the upper bearing-space $a$, the same being provided for the passage of the lug $b'$ from and to the interior of the frame when it becomes necessary to move the bolt perpendicularly, as hereinafter referred to. The said frame is provided in its front wall with an opening A′, preferably rectangular in form, through which the frangible sealing-plate D is introduced to its operative position interior thereof, as shown in Figs. 1, 2, 3, 4, and 5. The upper portion of the inner face of said front wall is transversely provided with a projection $a^4$. (Shown in Figs. 2 and 4.)

In Figs. 1, 2, 3, 4, and 9 the frame is shown to have a downwardly-extended portion $a^6$, which carries a keeper E for employment with the hasp F, attached to the car-door H′ by the staple G; but such arrangement is entirely optional, as the device may be employed and operated to equal advantage in conjunction with the ordinary keeper present and fixed to the car. An arm $b^4$ projects from the upper termination of the bolt B, at right angles to the axis thereof, and is the preferred means by which the same is manipulated.

S, Figs. 3, 5, and 8, indicates a slot cut through the lower terminal portion of the bolt, the same being provided for the employment of any ordinary car-seal applicable to the purpose in instances where the frangible sealing-plate may not be at hand or obtainable.

The operation of the device is as follows: To locate the sealing-plate D within the frame A, the bolt, being turned upon its axis to the position shown in Figs. 3 and 4, is moved or withdrawn perpendicularly until the projecting portion $b$ thereof comes in contact with the upper wall of the frame, being then given a quarter-revolution rearwardly, as indicated by the dotted lines shown in the upper part of Fig. 3, which carries the projecting portion $b$ into a position parallel with the vertical front of the frame, similarly to the position thereof shown in Figs. 1 and 2, the bolt, however, being shown in said Figs. 1 and 2 as occupying a different position perpendicularly. A frangible sealing-plate D, having a width suitably in excess of the width vertically of the opening A′, is passed through said opening to the interior of the frame, the upper portion of the sealing-plate extending in the direction of the projection $a^4$, and its lower edge resting upon the floor $a^5$ of the frame. The position of the bolt being as above described—to wit, as shown by the said dotted lines in Fig. 3—it is carried downwardly through its bearings until it reaches the position particularly shown in Figs. 1, 2, and 5, at which time the spring C drops into the recess $b^2$ thereof, vertically locking the bolt in such position. Through the said downward movement of the bolt the upper edge of the sealing-plate is engaged by the inclined face of the lug $b'$, which guides the same under the projection $a^4$ provided therefor, the said lug thereafter preventing the removal of the plate from such position, as shown in Fig. 2, until the bolt shall have been started through its unlocking operation. It may be noted that the seal-breaking projection $b$ is so located upon the bolt that in the last above described position of the bolt a line drawn lengthwise through said projection would be in a plane parallel with the vertical plane of the sealing-plate; also, that the length of said projection is greater than the distance between the sealing-plate and the bolt.

The unlocking of the device is accomplished as follows: The bolt being given a quarter-revolution forward by means of the arm $b^4$, the projection $b$ is brought rigorously in contact with the sealing-plate, breaking and destroying the same, as shown in Figs. 3 and 4. Through this partial rotative movement of the bolt the recess $b^2$ is carried beyond engagement with the spring C, which then bears upon the regular or peripheral surface of the bolt, (see Figs. 4 and 7,) in which position it is no longer capable of locking the bolt as against perpendicular movement preliminarily necessary to the introduction of another sealing-plate within the frame. To adjust another sealing-plate in position within the frame, the bolt is withdrawn from the last above described position and otherwise manipulated, as above fully described. Recurring to the relation which the slots $a^2$ and $a^3$ bear to the projecting lug $b'$, appearing on the bolt B, it will be observed that said slots are so arranged that the bolt cannot be withdrawn except when the sealing-plate is broken or absent from the frame and the said lug is in vertical alignment with the slot $a^3$, (shown by dotted lines in Fig. 6,) the spring C, when the bolt B is in its lower position, as shown in Figs. 1, 3, and 5, vertically locking it against withdrawal; also, that when a sealing-plate is carried into position within the frame the bolt cannot be returned without the projecting portion $b$ coming in breaking contact with said sealing-plate, except when said lug is in vertical alignment with the slot $a^3$, and through which arbitrary movement the proper situation of the projection $b$ with relation to the sealing-plate in locking the device is invariably guaranteed.

Other means than the particular construction and arrangement hereinbefore described and illustrated in the accompanying drawings may obviously be employed in carrying out the general features of my invention, which embraces all devices arranged and constructed upon the general principles embodied in the construction and arrangement herein described. Thus, for example, the bolt may be of any irregular form adapting the same to breaking the sealing-plate, in contradistinction to employing thereon the projection *b*. I therefore do not limit my invention except as set forth in the appended claims.

I claim—

1. In a seal-lock, in combination with the frame having a seal-holding space and the bolt journaled in such frame, and having both rotary and longitudinal movement in its bearings, and having a seal-breaking part which is moved into the seal-holding space by the rotary movement, a catch which locks the bolt to prevent its longitudinal movement out of locking position, the frame and the bolt having projections which co-operate to retain the seal in the seal-space, such projection on the bolt being so located thereon that it is moved into seal-retaining position by the longitudinal movement of the bolt, substantially as set forth.

2. In seal-locks, the combination of a lock-frame adapted to sustain in fixed position a frangible sealing-plate, substantially as shown, a perpendicularly and axially movable shackle-bolt sustained by said frame and provided with a suitable projecting portion *b* and a lug *b'*, and means for securing said bolt in a certain position, from which it cannot be withdrawn or removed without breaking the said sealing-plate when the same is fixed in position, all arranged and adapted to be operated substantially as set forth.

3. In a seal-lock, in combination with a frame having a seal-receiving space, a bolt having bearings in said frame and capacity for rotary and longitudinal movement in said bearings and protruding longitudinally from its bearings to effect the locking by its longitudinal movement, and having a seal-breaking portion which is moved into the seal-space to break the same by the rotary movement, and a catch lodged in the frame which engages the bolt to obstruct its longitudinal movement when said bolt has been moved longitudinally to locking position and been rotated out of its seal-breaking position, substantially as set forth.

4. In a seal-lock, in combination with a frame having the seal-receiving space, a bolt having bearings in said frame and capacity for rotary and longitudinal movement in said bearings and protruding longitudinally from said bearings to effect the locking, and having a seal-breaking part which is moved into the seal-space to break the seal by the rotary movement, and a catch in the frame which engages the bolt to obstruct its longitudinal movement when the bolt has been moved longitudinally into locking position and rotated out of seal-breaking position, the frame having a keeper E, through which the bolt protrudes when in locked position, and the bolt having a transverse aperture S beyond said keeper, substantially as set forth.

5. In combination, the frame A, the locking-bolt B, journaled therein and having capacity for longitudinal and rotary movement in its bearings, said frame having a seal-receiving space, and the bolt having a projection *b*, which moves into said space when the bolt is rotated, and having a transverse slot $b^2$, the leaf-spring C, extending transversely with respect to the bolt and adapted to seat in said slot, and the frame having a transverse cavity in which said spring is retained and prevented from moving longitudinally with respect to the bolt, substantially as set forth.

6. In combination with the frame A, having the seal-receiving space, and the spring-retaining cavity, and the spring C therein, the bolt B, having a seal-breaking projection, the spring-engaging notch $b^2$, and the projection $b'$, the frame being provided at the upper part with notches $a^2$ and $a^3$, ninety degrees separated in the arc of movement of the projection $b'$ about the axis of the bolt-bearings, substantially as and for the purpose set forth.

In testimony whereof I have hereunto set my hand, in the presence of two witnesses, at Chicago, Illinois, this 9th day of April, 1889.

CHARLES E. DAVIS.

Witnesses:
CHAS. S. BURTON,
JEAN ELLIOTT.